United States Patent [19]

Ezekiel et al.

[11] 4,227,100
[45] Oct. 7, 1980

[54] DUAL OUTPUT FORCE MOTOR

[75] Inventors: Frederick D. Ezekiel, Lexington; Alf L. Carroll, Jr., Cohasset, both of Mass.

[73] Assignee: The Foxboro Company, Foxboro, Mass.

[21] Appl. No.: 15,280

[22] Filed: Feb. 26, 1979

Related U.S. Application Data

[63] Continuation of Ser. No. 801,692, May 31, 1977, abandoned.

[51] Int. Cl.$^2$ ............................................. H02K 33/00
[52] U.S. Cl. ......................................... 310/13; 310/27
[58] Field of Search .................................. 310/13, 27; 179/115.5 UC

[56] References Cited

U.S. PATENT DOCUMENTS

| | | | |
|---|---|---|---|
| 2,931,925 | 4/1960 | Dölz | 310/27 |
| 3,018,467 | 1/1962 | Harris | 310/27 X |
| 3,924,146 | 12/1975 | George | 310/12 X |
| 4,075,517 | 2/1978 | Adler | 310/13 |
| 4,136,293 | 1/1979 | Patel | 310/13 |

*Primary Examiner*—Donovan F. Duggan
*Attorney, Agent, or Firm*—Andrew T. Karnakis

[57] ABSTRACT

An electric force motor includes two movable and independently actuatable coils energized by a single magnetic circuit. Air gaps are formed at respective ends of a tubular permanent magnet between a core of magnetically permeable material mounted within the magnet and pole pieces attached to opposite ends of the magnet. Such a configuration thus establishes a serial magnetic circuit connecting the magnet and the core through each of the air gaps. The two coils, each positioned within the respective air gaps, receive independent electrical input signals to develop corresponding output forces. Interactions between each coil that would tend to affect accuracy are minimized by choosing a magnet of high coercivity and by limiting the amount of input current applied to each coil.

3 Claims, 3 Drawing Figures

DUAL OUTPUT FORCE MOTOR

This is a continuation of application Ser. No,. 801,692 filed May 31, 1977 now abandoned.

FIELD OF THE INVENTION

This invention relates to electric force motors. More particularly, this invention relates to a compact force motor of the moving coil type capable of providing two independently controllable output forces.

DESCRIPTION OF THE PRIOR ART

Force motors which convert an electrical input signal into an output force have been known in the art for many years. Motors of many varied designs have been used, but one type that has been used in a wide variety of applications is the so-called voice coil or moving coil motor. It is well established that when current is applied to a coil positioned in a magnetic field with a segment of the coil perpendicular to the field, a force is exerted on the coil segment that is perpendicular both to the magnetic field and to the flow of current. The direction of this force is dependent on the direction of current flow and the directon of magnetic field. For a magnetic field of given density, the force produced is directly proportional to the applied current.

Because of this linear relationship, moving coil force motors have been widely used as electro-mechanical transducers in instruments that measure force or pressure, for example differential pressure transmitters. Also such motors have been used as actuators to precisely control the position of an output member. Typically, such motors employ a single coil as the force actuator, and thus applications which require processing of two or more independent output forces necessitate the use of multiple force motor assemblies, with an accompanying increase in cost and bulkiness. Consequently, prior art force motors having single actuators have not been wholly satisfactory in all applications.

SUMMARY OF THE INVENTION

The present invention provides an electric force motor having two movable and independently actuatable coils energized by a single magnetic circuit. Such a device is of simple, compact structure and may be advantageously used with any system requiring dual actuation or force measurement where limitations of space and economy of manufacture are of paramount importance. In a preferred embodiment of the invention, two coils are positioned each within an air gap formed at opposite ends of a tubular permanent magnet. Circular air gaps are formed by mounting a cylindrical core of magnetically permeable material within the magnet and by attaching pole pieces to opposite ends of the magnet. This configuration provides a magnetic circuit serially connecting the magnet and the core through each of the air gaps and thus through the operative segments of the coils.

Each coil receives an independent input voltage which generates a current in the coil. This current develops a corresponding force that independently moves each coil along the axis of the motor assembly in a direction determined by the polarity of the input signal. The forces developed by the moving coils may be transmitted externally by any suitable means, for example by an output member transversely coupled to the coils.

The overall configuration of the present invention provides reliable, accurate measurement/actuation of two independent forces in one simple, compact, co-axially symmetric assembly.

Other aspects and advantages of this invention will be pointed out in, or apparent from the following written description considered with the accompanying drawings.

DESCRIPTION OF THE PREFERRED EMBODIMENT

Figure 1:
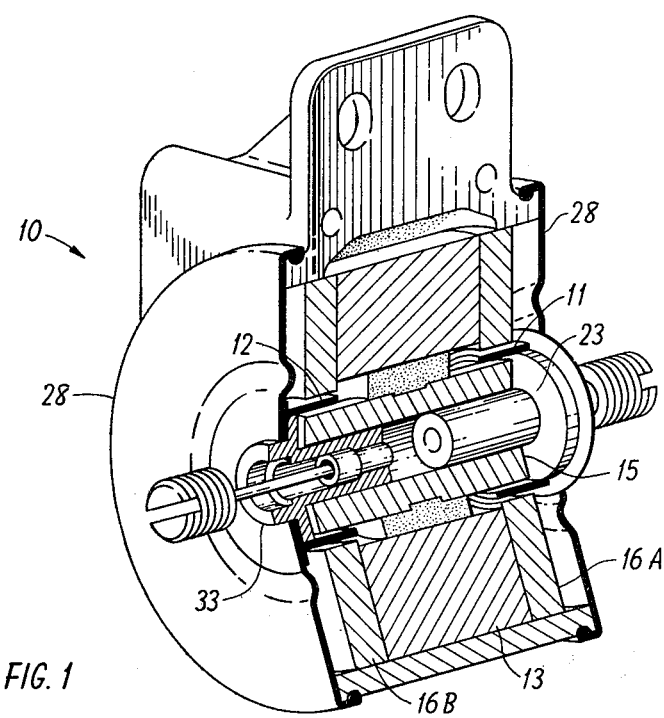
FIG. 1 is a perspective view, partially cut away, of a force motor embodying one form of the present invention.

Referring now to the drawings, an electrical force motor 10 is arranged as a dual actuator capable of receiving indpendent electrical input signals and converting these to corresponding forces in respective coils 11, 12. The motor shown in this embodiment has been arranged as a transducer for electromechanically controlling the position of multiple pen assemblies in an industrial process control recorder. This transducer actuates a clutching mechanism in the motor driven recording instrument so that the position of two pens may be independently and precisely controlled by one assembly. Details of how such a dual actuator transducer interacts with the recorder are revealed in pending application Ser. No. 771,544, filed on Feb. 24, 1977, by J. R. Curran et al and assigned to the same assignee of this application.

Figure 2:
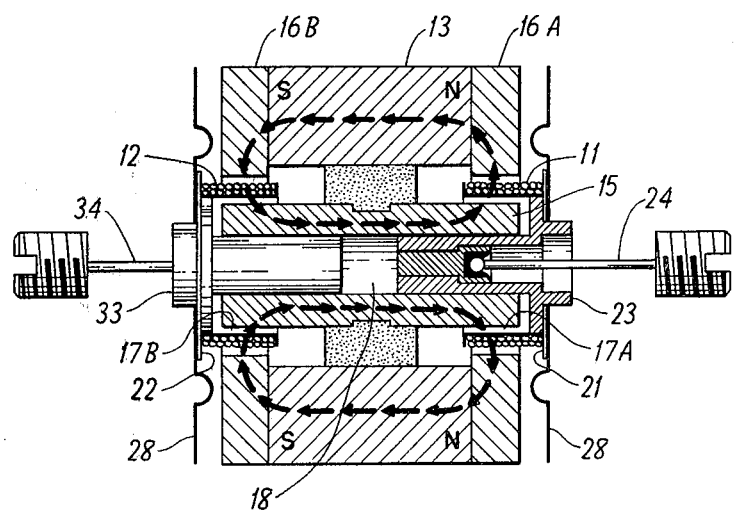
FIG. 2 is a partial schematic representation of the motor of FIG. 1 exaggerated to show details of the magnetic field distribution and the independent actuation of both coils.

The motor 10 includes a tubular permanent magnet 13, forming an outer structure, axially-magnetized such that its north and south poles are located at opposite ends of the magnet. Within the tubular structure of the magnet, a cylindrical core 15, forming an inner structure, of magnetically permeable material is concentrically attached such that the core is spaced from the magnet and extends outwardly beyond the ends of the magnet. The core if formed with a central bore 18 whose function will be discussed subsequently. The magnet assembly is completed by mounting cylindrical pole pieces 16A, 16B on the ends of the magnet such that circular, co-axial air gaps 17A, 17B are formed at opposite ends of the magnet. Thus a magnetic circuit is formed whose lines of flux serially connect the permanent magnet and the inner core through each of the air gaps (see FIG. 2).

The coils 11, 12 are wound on circular bobbins 21, 22 which are axially fastened to elongate tubular sleeves 23, 33 that are inserted within the bore 18 so as to centrally locate the coils within each air gap. These sleeves provide a low-friction sliding fit allowing bi-directional, axial movement of the coils when energized. In addition, the sleeves serve as guides preventing the bobbins from cocking and possibly contacting either the pole pieces or the central core. Mounted within the sleeves and extending axially beyond the bobbin/coil assemblies are rods 24, 34 which externally transmit the forces generated by the current in the respective coils.

Each coil is electrically connected to an input signal, typically either a positive or negative voltage. Depending on the polarity of the voltage impressed across the coil, a d-c current flows through the windings of the coil which, in the presence of the magnetic field, develops a force in the coil causing it to move in a prescribed direction along the axis of the motor assembly (i.e., inwards or outwards). A flexible dust cover 28 mounted on opposite ends of the motor prevents contaminants from entering the motor without limiting the free motion of the bobbins.

The unique compact configuration of the present invention wherein two coils may be independently energized to develop corresponding output forces by a single magnetic circuit affords overall volume reduction. However, in order to keep the size of the motor as small as possible and yet retain the high output accuracy required in most industrial applications, the interaction between each coil must be effectively minimized. Such inaccuracies typically result either from the steady-state magnetic field set up by the current passing through the coil which could, dependent on polarity, oppose or enhance the permanent magnetic field, or from a back-emf caused by the movement of one coil.

Figure 3:
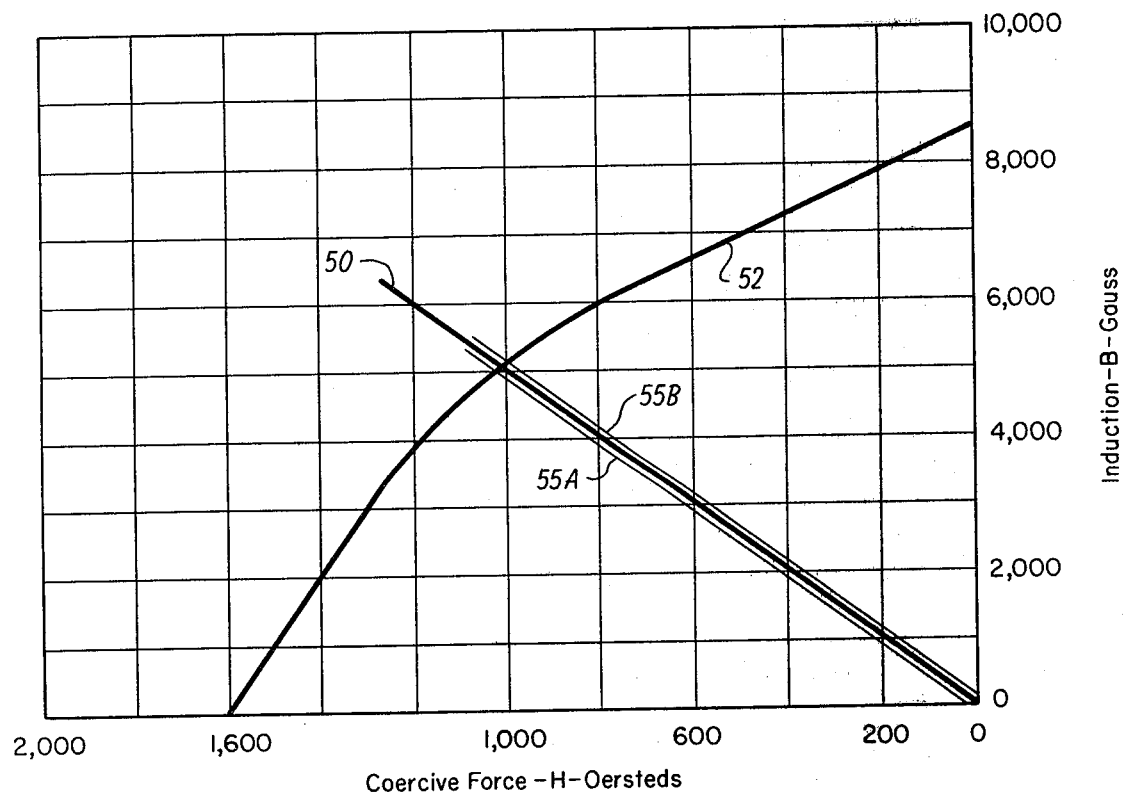
FIG. 3 is a graph showing the demagnetization characteristics of the magnetic circuit used in the preferred embodiment.

In the present force motor, the magnet 13 is formed from Alnico 8, which exhibits a relatively high coercive force (i.e., approximately 1600 oersteds maximum). The operating point for the magnetic circuit of the preferred embodiment (determined by the intersection of the load line 50 with the demagnetization curve 52 for Alnico 8) is about 1000 oersteds (see FIG. 3). Under normal operating conditions the maximum input current available to each coil is 50 milliamperes. Assuming as a worst case condition that maximum steady-state current is applied to one coil, that coil is capable of generating only about 20 oersteds. This approximate 2% change in coercive force produces a parallel shift in the load line that, dependent on polarity, may be positive or negative as indicated generally by reference numerals 55A, 55B. Such a small change in the operating point has a negligible effect on the proper functioning of the other coil, thereby maintaining high overall output accuracy of the motor.

Although a specific embodiment of the present invention has been set forth above, it is to be emphasized that this is for the purpose of illustration and should not be considered limiting. It will be obvious to those skilled in the art that modifications may be made without departing from the spirit and scope of the invention as set forth in the accompanying claims.

We claim:
1. An electrical force motor comprising:
an elongate tubular structure of magnetic material;
an elongate cylindrical structure of magnetic material positioned within said tubular structure and spaced therefrom;
pole piece means attached to opposite ends of said structures forming coaxial circular air gaps of equal diameter and width at the respective ends;
one of said structures including permanent magnet means establishing a single magnetic flux path which serially passes through both said tubular and cylindrical structures and across each air gap at the respective ends of said structures;
first and second movable coils of equal diameter positioned within said air gaps respectively and adapted to be actuated by independent electrical signals;
said permanent magnet means being formed of a material exhibiting high coercive forces that are sufficient to substantially minimize the effect on the output force of one coil that is produced by an electrical signal applied to the other of said coils, whereby said coils may develop corresponding non-interactive output forces.

2. Apparatus as claimed in claim 1 wherein said tubular structure comprises an axially-magnetized permanent magnet;
said cylindrical structure being formed of magnetically permeable material and serving as a return path for the flux generated by said permanent magnet.

3. Apparatus as claimed in claim 2 wherein said permanent magnet is formed from Alnico 8.

* * * * *